United States Patent [19]
Leveque

[11] 4,271,499
[45] Jun. 2, 1981

[54] METHOD AND APPARATUS FOR DIGITALLY IMPLEMENTING A LINKED COMPRESSOR-EXPANDER TELECOMMUNICATIONS SYSTEM

[75] Inventor: J. Howard Leveque, Harper's Ferry, W. Va.

[73] Assignee: H.F. Communications Corporation, Frederick, Md.

[21] Appl. No.: 923,959

[22] Filed: Jul. 12, 1978

[51] Int. Cl.³ .............................................. H04J 3/18
[52] U.S. Cl. ......................................... 370/7; 370/94; 370/111
[58] Field of Search ........ 179/15 BW, 15 AS, 15 BY, 179/15 AV; 370/111, 60, 94, 7

[56] References Cited

U.S. PATENT DOCUMENTS

| | | | |
|---|---|---|---|
| 3,311,704 | 3/1967 | Filipowski | 179/15 BY |
| 3,500,441 | 3/1970 | Brown | 333/14 |
| 3,586,781 | 6/1971 | Jones | 179/15 BY |
| 3,895,322 | 7/1975 | Stewart | 333/14 |
| 3,988,545 | 10/1976 | Kuemmerle | 179/15 BV |
| 4,063,220 | 12/1977 | Metcalfe | 178/58 A |
| 4,074,232 | 2/1978 | Otomo | 179/15 BV |
| 4,123,711 | 10/1978 | Chow | 333/14 |

*Primary Examiner*—David L. Stewart
*Attorney, Agent, or Firm*—Arnold, White & Durkee

[57] ABSTRACT

A linked compressor-expander (LINCOMPEX) circuit for use in telecommunications is implemented digitally. A speech compressor circuit in a modulator and a speech expander circuit in a demodulator controllably attenuate given syllables of a speech signal by values determined in response to binary input signals which collectively represent the amplitude of a given symbol of the speech signal. A control tone signal is generated by the modulator, and the demodulator is responsive to the control tone signal for operating the voltage attenuator circuit of the digital expander to thereby reconstruct the speech signal. Calibrate circuitry is provided for periodically detecting a test frequency of the control tone generator during a brief period prior to transmission of syllables of the speech signal. Also included is a data multiplexing circuit for transmitting and receiving data between speech syllables to optimize transmitter loading.

46 Claims, 11 Drawing Figures

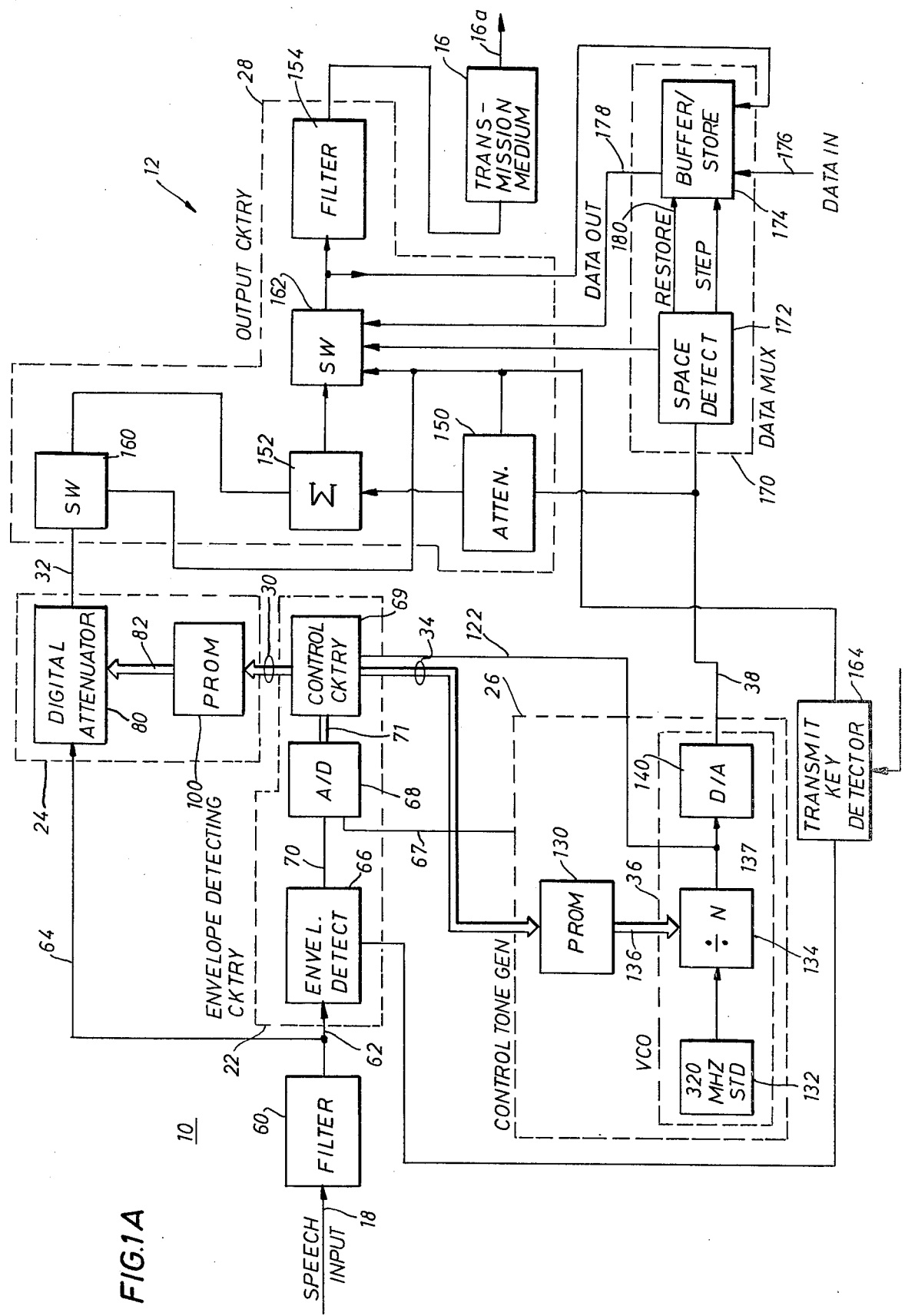

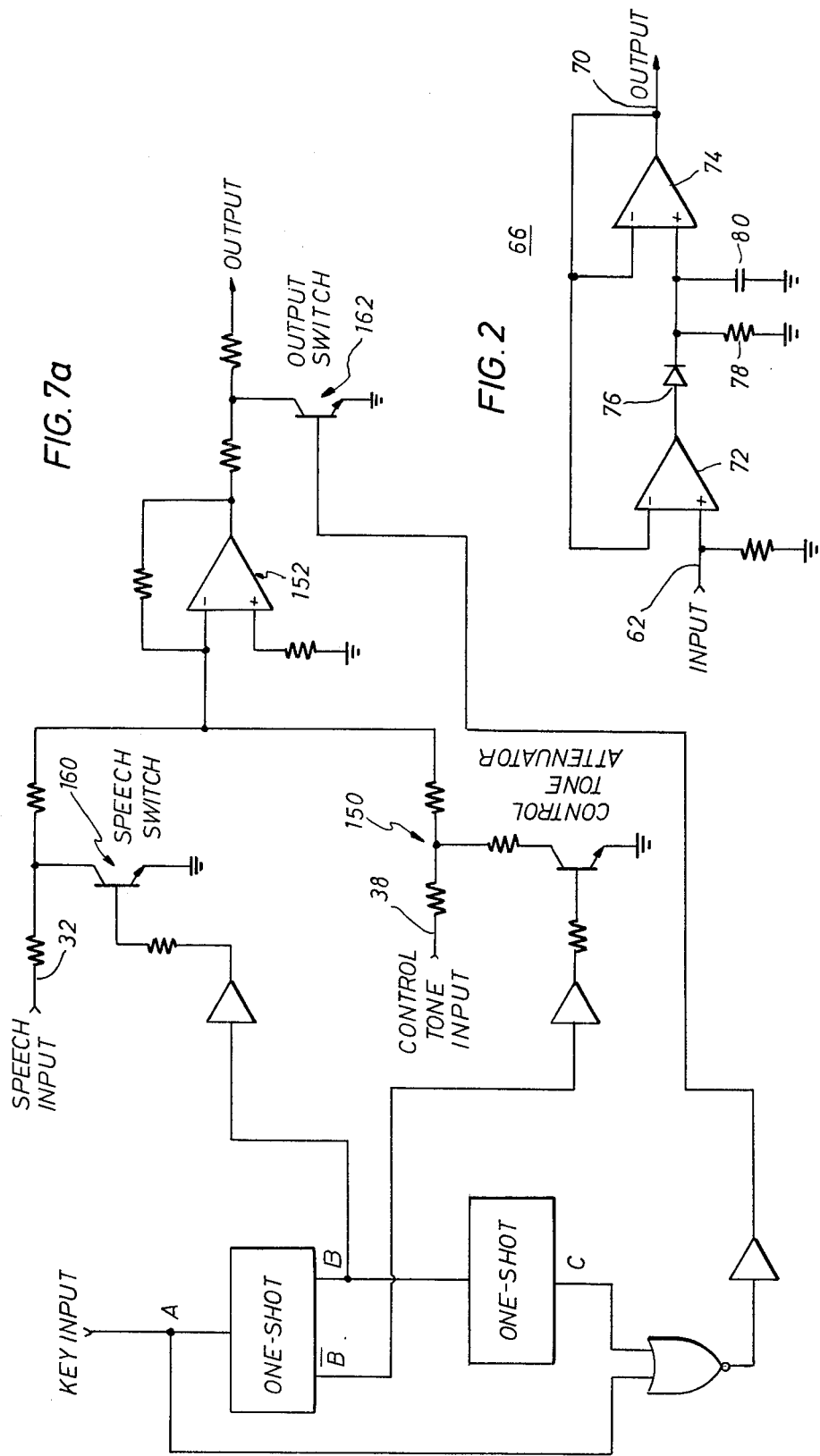

METHOD AND APPARATUS FOR DIGITALLY IMPLEMENTING A LINKED COMPRESSOR-EXPANDER TELECOMMUNICATIONS SYSTEM

BACKGROUND OF THE INVENTION

The present invention relates to telecommunications systems in general, and more specifically relates to linked compressor-expander circuits (LINCOMPEX) circuits implemented digitally.

Linked compressor and expander (hereafter LINCOMPEX) systems for telecommunications networks have generally been known since the early 1960's. Various specifications for present LINCOMPEX systems have been set forth. For example CCIR report #354, CCIR recommendation #455-1, British Post Office Specification #W6819B, and various articles and publications define specifications and implementing techniques for present day LINCOMPEX systems.

The presently developed LINCOMPEX systems have used analog circuitry. The technical requirements, such as given in the above publications, are sufficiently stringent to require the use of highly accurate analog circuits. For example, a control tone requirement of many specifications is that the center frequency must be 2900 Hz±1 Hz with a ratio of change of 2 Hz per db. This sort of requirement of precision translates into increased costs, increased sizes, increased set-up and adjustment time, increased maintenance cost, and decreased reliability. A relatively large number of analog components are required, and they suffer because of susceptability to temperature and humidity conditions. The power consumed in such analog systems is relatively high, and the necessary operating controls are numerous. Because of the large unit size and weight, previous LINCOMPEX systems have, in general, not been suitable for inclusion within the cabinet of the transmitter unit.

Such analog systems have also suffered from calibration difficulties. As environmental conditions and as component operating characteristics vary, such analog systems require rather complicated procedures for calibrating the demodulator, at a remote end of a transmission medium, with a modulator at the transmitting end.

Such analog systems also have not been suitable for efficient transmitter usage. For example, periods between syllables of transmitted speech in previous LINCOMPEX systems have not been used for transmission. This results in overall inefficient telecommunications networks.

SUMMARY OF THE INVENTION

The above noted and other deficiencies of the prior art are overcome by providing a method and apparatus for digitally implementing a LINCOMPEX system featuring special calibrate and data multiplexing capabilities. The digital implementation reduces structural size and weight, minimizes internal adjustments, set-up time, and necessary operating controls. The digital design is relatively simple, minimizing the number of necessary components and providing a long maintenance cycle. The digital implementation decreases the unit's susceptability to temperature and humidity conditions and provides a unit of relatively low power consumption.

The data multiplexing capability allows data to be transmitted between the transmission of speech syllables for achieving efficient system operation. The calibration feature is automatic and periodically adjusts the system for any drifting of the operating parameters of the system.

According to one embodiment of the invention a digital speech modulator is provided for modulating syllables of a speech signal onto a transmission medium. The modulator includes a digital compressor circuit which comprises a voltage attenuator circuit, a control tone generator circuit, and an output circuit. The voltage attenuator circuit compresses the speech signal by controllably attenuating a given syllable of the speech signal by a value determined in response to a first plurality of binary input signals collectively representative of the amplitude of the given syllable. The control tone generator circuit produces a control tone signal for transmission on the transmission medium the frequency of the control tone being representative of the amplitude variance of a given syllable of the speech signal. The output circuit combines the compressor speech signal and the control tone signal for transmission onto the transmission medium.

Preferably the voltage attenuator circuit comprises a plurality of resistors and a plurality of switches associated with the resistors. The resistors are coupled to receive the speech signal, and the switches are responsive to the first plurality of binary input signals for allowing conduction of the speech signals through selective ones of the resistors, thereby selectively attenuating the speech signal.

According to another aspect of the invention, the first plurality of binary input signals are generated using a read-only-memory. Preferably the read-only-memory is programmable and is associated with an encoder. The encoder is responsive to a plurality of N-bit binary signals representative of the amplitude of a given syllable of the compressed speech signal and generates a set of less-than-N binary signals to the read-only-memory. The range of values represented by the N-bit signals is spanned by the values of the less-than-N bit signals according to a weighted curve. Preferably, the curve is weighted such that low values of the N-bit signals are more equal to the respectively produced value of the less-than-N bit signals than are the corresponding higher values.

The control tone generator circuit includes a phase-locked-loop voltage controlled oscillator and a variable frequency divider circuit. The voltage controlled oscillator generates an oscillator signal of a constant frequency, and the divider circuit changes the frequency of the oscillator signal corresponding to the amplitude variance of a given syllable of the speech signal. Preferably the divider circuit is a variable modulus divider wherein the value of the modulus is determined in relation to the amplitude of the syllable.

According to another feature of the invention, the modulator includes a calibrate circuit. The calibrate circuit includes an attenuator coupled to the output of the variable voltage divider, and it selectively attenuates the control tone signal. A switch is coupled to the output of the digital compressor circuit, and the switch and the attenuator are operated to momentarily allow an unattenuated, unmodulated control tone signal at a center frequency to be transmitted onto the transmission medium in the absence of the compressed speech signal.

According to another feature of the invention, the modulator further includes a data multiplexor for increasing transmission efficiency. The data multiplexor detects quiet periods between the transmission of the compressed speech syllables on the transmission medium and selectively inserts packets of data onto the transmission period during the quiet periods. Preferably the data multiplexer includes a buffer-store circuit and a restore circuit. The buffer-store circuit selectively provides the packets of data to the transmission medium, and the restore circuit selectively restores a given packet of data to the buffer store circuit if the quiet period is insufficient to transmit the entire data packet.

According to another embodiment of the invention, a speech demodulator for demodulating syllables of a received, compressed speech signal has a expander circuit which is digitally implemented. The digital expander circuit comprises a voltage attenuator circuit for controllably attenuating a given syllable of the compressed speech signal by a value determined in response to a first plurality of binary input singals which are collectively representative of the amplitude variance of a syllable of the speech signal prior to its being compressed. The compressed speech signal is frequency modulated and has a substantially constant amplitude.

In the preferred embodiment a read-only-memory is provided for generating the plurality of binary input signals to the voltage attenuator circuit of the expander. Preferably the read-only-memory is programmable.

The demodulator also includes a control tone discriminating circuit for generating to the programmable read-only-memory a set of digital signals indicative of the amplitude variance of a syllable of the compressed speech signal.

During a predetermined time period prior to the transmission of compressed speech, an unmodulated, unattenuated, control tone signal is transmitted to the demodulator. At least one counter and at least one latch circuit are provided for storing the calibration frequency value. During demodulation of speech, the value of the counter is changed corresponding to the modulation of the control tone signal. The changed value is utilized for providing the set of digital signals indicative of the amplitude variance of the speech signal. The latch circuit causes the counter to be reset for processing the subsequent speech syllable.

According to another feature of the invention, a signal-to-noise ratio circuit is provided for indicating a poor received speech signal-to-noise ratio in the demodulator. The quality of control tone signals during given periods is detected for generating a signal-to-noise ratio signal which may be utilized for several functions. For example the digital expander circuit in the demodulator may be deactuated in response to the signal, or the demodulated speech signal may be muted when the value of the signal-to-noise ratio signal falls below a predetermined value.

According to another aspect of the invention, a method for increasing the efficiency of a LINCOMPEX system includes the step of time-division-multiplexing packets of data onto the transmission medium during time periods when syllables of speech are not being sent. When a quiet period is detected, the packets of data are transmitted until interrupted by the transmission of a speech syllable. Whether a complete packet of data has been transmitted upon the interruption is detected and the packet of data is retransmitted if a complete packet had not been transmitted. In the demodulator, if a complete packet had not been transmitted, the demodulator aborts the received data.

According to another aspect of the invention, a method of expanding compressed speech signals is provided. Cylces of the control tone signal are transmitted at a nominal, unmodulated calibration frequency for a first period of time. The value of the unmodulated control tone signal frequency is detected, and this value is changed according to the frequency modulator control tone signal. That resulting changed value is indicative of the amplitude calibration point of the unmodulated speech signal. The compressed speech signal is thereupon attenuated by an amount determined by the change value.

In more detail, the step of detecting the control tone frequency value, and the step of changing the value comprise the steps of zeroing a counter and incrementing the counter during one portion of each cycle of the control tone signal until the center frequency value is achieved. The value of this counter is thereupon counted down in accordance with the modulated control tone signal. Each counted down value is indicative of an instantaneous amplitude variance of the speech signal and is used for expanding the compressed speech signal.

It is accordingly a general object of the present invention to provide a new and improved LINCOMPEX circuit which is digitally implemented.

The above noted and other objects, advantages and features of the present invention will become apparent upon a detailed reading of a preferred embodiment of the invention when read in conjunction with the accompanying drawings.

BRIEF DESCRIPTION OF THE DRAWINGS

FIGS. 1a and 1b depict a digitally implemented LINCOMPEX system according to one embodiment of the invention;

FIG. 2 illustrates a preferred embodiment of an envelope detector used in the system of FIGS. 1a and 1b;

DETAILED DESCRIPTION OF A PREFERRED EMBODIMENT

Figure 1B:
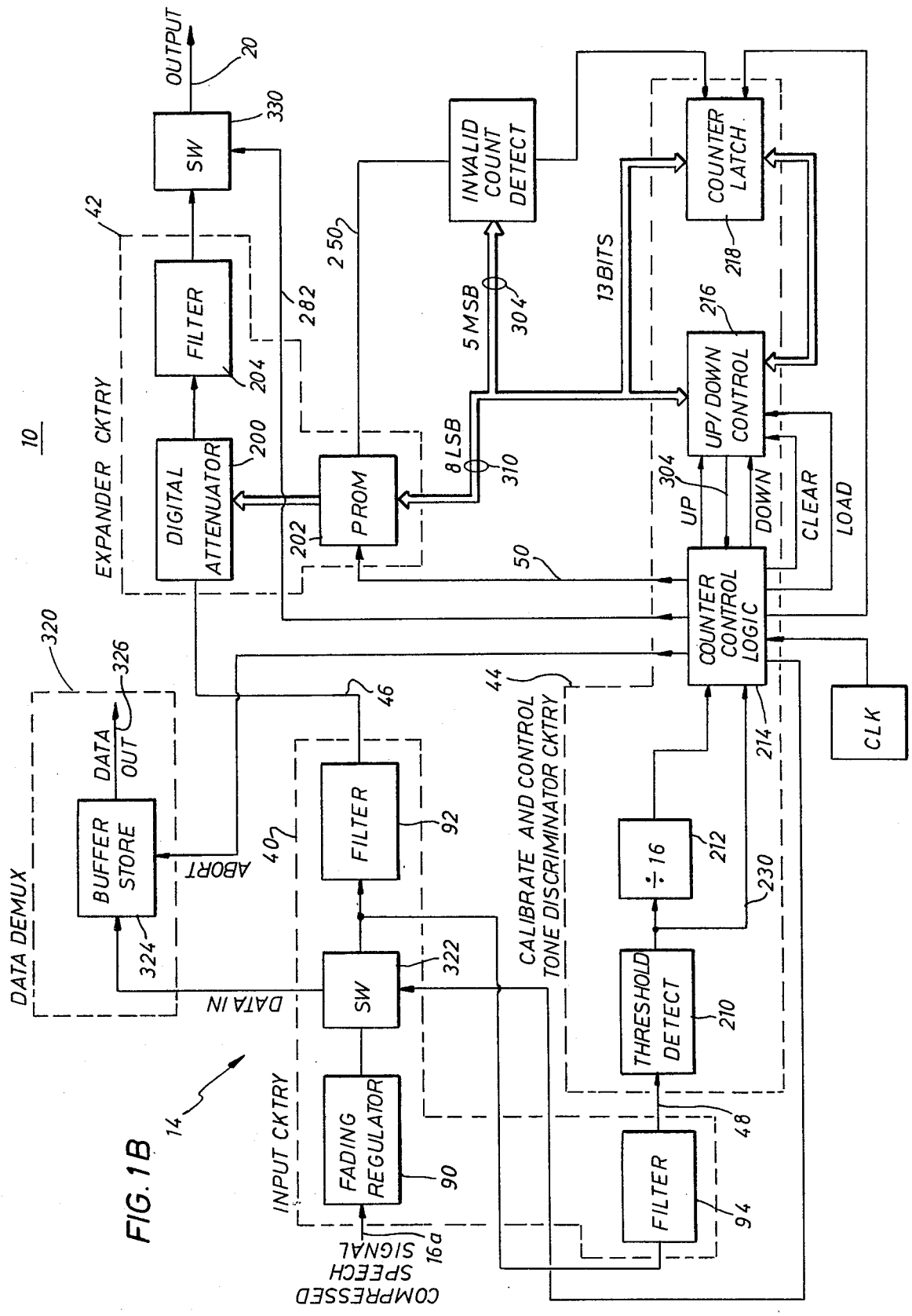

Referring now to FIGS. 1a and 1b, a telecommunications system 10 is shown which incorporates a linked compressor and expander (hereafter LINCOMPEX) circuit according to the invention. The system 10 includes a modulator 12 and a demodulator 14 coupled at remote ends of a transmission medium 16. Speech is input to the modulator 12 on an input line 18, is modulated by the modulator 12 and sent out onto the transmission medium 16, and is demodulated by the demodulator 14 for output on an output line 20.

The input line 18 may be connected to any audio source, such as a microphone, a telephone line, a radio link, etc. The output line 20 is connected to any device which is responsive to audio frequency sounds, such as radio frequency transmitters, telephone lines etc. The transmission medium 16 can be any communications channel, such as a telephone line or radio communications link, etc.

Referring again to FIG. 1a, the LINCOMPEX modulator 12 includes envelope detecting circuitry 22, compressor circuitry 24, a control tone generator 26, an output circuitry 28. Speech signals input on the line 18 are input to the envelope detecting circuitry 22 and to the compressor circuitry 24. Variations in the envelope of the speech signal are detected by the circuitry 22 for controlling operation of the compressor circuitry 24 via a line 30 such that the amplitude of the speech signal, as compressed by the circuitry 24, is held essentially constant. This compressed speech signal is output from the circuitry 24 onto a line 32 where it is coupled to the output circuitry 28 for transmission on the medium 16.

The envelope detecting circuitry 22 also generates a signal on a set of lines 34 to the control tone generator 26 for generating a control tone signal. The control tone signal takes the form of a frequency modulated signal generated by a voltage controlled oscillator (VCO) 36. The 36 generates the control tone signal to have a frequency which is representative of the amplitude variance of a given syllable of a speech signal before it is compressed by the compressor circuitry 24. The control tone signal is output on a line 38 to the output circuitry 28 where the tone is added by a frequency division multiplexing to the compressed speech signal. The control tone signal and the compressed speech signal are transmitted on the medium 16 on a syllable by syllable basis such that a given syllable of speech on the line 18 eventually has its frequency component characterized by the corresponding syllable of compressed speech and has its amplitude component represented by the frequency of the associated control tone signal. One common specification for LINCOMPEX has the control tone signal center frequency of 2.9 KHz., and the speech signal frequencies are below the control tone.

Referring now to FIG. 1b, the demodulator 14 includes input circuitry 40, expander circuitry 42, and calibrate and control tone discriminator circuitry 44. The circuitries 40, 42, 44 function essentially in reverse of the modulator 12. That is, the compressed speech signal from the transmission medium 16 is regulated by receiver automatic gain control (AGC) and by the input circuitry 40 to achieve a constant amplitude level. The control tone signal is detected by the circuitry 44 wherein the amplitude information characterizing the uncompressed speech signal is retrieved. The circuitry 44 thereupon utilizes this amplitude information to control the expander circuitry 42 in a manner opposite to that in which the compressor was controlled. That is, the expander circuitry 42 is coupled to the input circuitry 40 by a line 46 for receiving syllables of the compressed speech signal. The input circuitry 40 delivers the control tone signal by a line 48 to the circuitry 44 which in turn produces signals on a line 50. The signals on the line 50 operate the expander circuitry 42 to restore the original speech envelope. The expanded speech signal, i.e. the restored original speech envelope, is thereupon output on to the line 20.

The general functional operation of the modulator 12 and demodulator 14 as above described is conventional.

Prior systems, however, have implemented the above described functions using analog circuitry. This has posed problems as described in the Background of the Invention section hereof. One particular example of a specification which has posed difficulties for analog circuitry is the accuracy requirement for the generation of the control tone frequency. Present specifications usually require a center frequency for the control tone signal of 2900 Hz plus or minus 1 Hz with a rate of change of 2 Hz per db, and, for a given signal level input to the modulator 12, the control tone signal frequency must be within ±2 Hz of the theoretical value at any point over a 60 db range. Conventionally, the control tone signal is generated by a voltage controlled oscillator (such as the VCO 36) which inturn is controlled by the output of a logarithmic circuit. The logarithmic circuit is driven by an envelope detector whose output must also simultaneously control the compressor circuitry (such as circuitry 24). To match all of these functions to within ±2 Hz accuracy over temperature, humidity, production variations, etc., is a difficult analog design job. According to an outstanding feature of the present invention, the implementation of many of the modulator 12/demodulator 14 circuits is digital.

The Modulator 12

Referring again to FIG. 1a, the unattenuated speech signal on the line 18 is initially input to a bandpass filter 60. Assuming that the transmission medium 16 is a voice grade telephone line having a 3000 Hz bandwidth, the bandpass filter 60 has a pass band of 300 Hz–2700 Hz. The output of the filter 60 is on a line 62 to the envelope detecting circuitry 22 and on a line 64 to the compressor circuitry 24.

The envelope detecting circuitry 22 includes an envelope detector 66, an analog to digital converter 68 which is coupled to the detector 66 by a line 70, and control circuit 69. The detector 66 is a precision detector which translates the speech signal into a continuous representation of the envelope thereof. The control circuitry 69 generates a plurality of binary signals on the lines 30 to the compressor circuitry 24 for controlling the amount of compression of each syllable of the unattenuated speech signal on the line 64. The control tone generator 26 provides a CC (cycle control) signal to the converter 68 on a line 67.

The envelope detector 66 generates an envelope signal on the line 70 which is the amplitude variation information of the audio speech signal. The envelope signal is converted from analog form to a digital format by the analog to digital converter 68. In the illustrated embodiment, a 12 bit format is utilized, and the converter 68 converts the envelope signal to a 12 bit parallel digital format. Each word (from a low order word of all zeros to a highest order word of all ones) of the digital envelope signal represents a discrete envelope level of a given syllable of the speech signal such that all zero bits represents the smallest amplitude variation and all one bits represents the highest amplitude vairation.

A preferred envelope detector 66 is shown in FIG. 2. The envelope detector 66 encloses a pair of operational amplifiers 72, 74 interconnected by a diode 76. A resistor 78 is coupled between the diode 76 and the amplifier 74 such that the envelope detector 66 functionally is described as a peak detector having a discharge resistor followed by a voltage follower.

In operation, when the input voltage of the amplifier 72 becomes greater than the output voltage of the amplifier 74, the output of the amplifier 74 becomes positive and the diode 76 conducts. A capacitor 80 connected in parallel with the resister 78, is then charged through the diode 76 to the value of the input on the amplifier 72. When the input to the amplifier 72 falls below the capacitor 80 voltage, the output of the amplifier 72 becomes negative, and the diode 76 becomes reverse-biased. At this point, the capacitor 80 begins to discharge through the resistor 78. This discharge continues until the input to the amplifier 72 becomes more positive than the capacitor 80 voltage, thus charging the capacitor 80 to a new peak value. The amplifier 74 prevents any discharge of the capacitor due to external loading conditions. The analog to digital converter 68 (FIG. 4) is a standard unit.

The compressor circuitry 24 receives the filtered speech signal on the line 64 and generates a compressed speech signal having syllables which are unclipped, essentially constant-amplitude signals containing the frequency variations of the speech signal on the line 18. This is accomplished by variably attenuating the filtered speech signal by values determined in accordance with the digital signals on the lines 30 from the envelope detecting circuitry 22.

As an outstanding feature of the invention, the compressor circuitry 24 includes a digital attenuator 80 which has a set of control inputs responsive to a plurality of digital signals on a set of lines 82. The digital attenuator 80 compensates for all syllabic envelope variations in the unattenuated speech signal in accordance with the digital signals on the lines 82. The output of the attenuator 80 is an unclipped, essentially constant amplitude signal containing the frequency variations of the unattenuated speech signal on the line 18.

Figure 3:
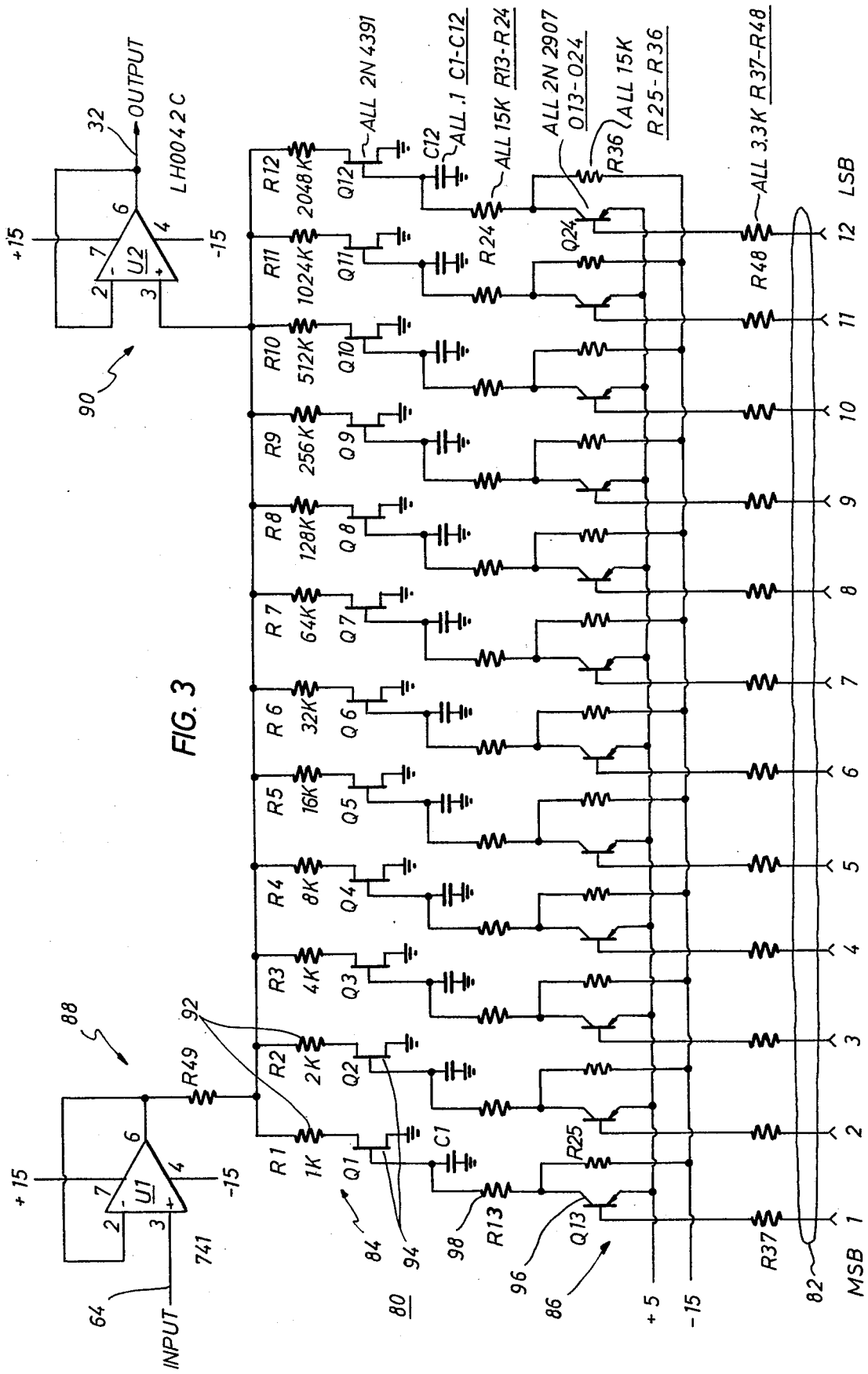
FIG. 3 discloses a preferred embodiment of a voltage attenuator utilized in the expander and compressor circuits of the system of FIGS. 1a and 1b.

A preferred digital attenuator 80 is shown in FIG. 3. The attenuator 80 includes a plurality of resistor circuits 84 and a plurality of switch circuits 86. The resistor circuits 84 are coupled to receive the filtered speech signal on the line 64 via an input buffer amplifier 88. The resistor circuits 84 are coupled to the line 32 for outputting the compressed speech signal via an output buffer amplifier 90. The buffer amplifier's 88, 90 establish a constant impedance for the resistor circuits 84 and isolate them from the remainder of the circuitry.

Each of the resistor circuits 84 includes a resistor 92 and a switching transistor 94. Preferably the switching transistors 94 are field effect transistors. Whenever the switching transistors 94 are rendered conductive by the switch circuits 86, the syllables of the speech signal are variably attenuated through the resistors 92 to circuit ground. The values of the resistors 92 are such that they produce progressive attenuation steps when the respective resistor circuits 84 are activated in a binary sequence.

The switch circuits 86 are essentially digital logic circuits comprising a driver transistor 96 coupled to the switching transistor 94 via a resistor 98. The bases of the driver transistors are coupled to the lines 82 for receiving the digital signals representing the amplitude of the unattenuated speech signal on the line 64.

The compressor circuitry 24 also includes a circuit for generating the digital signals on the lines 82 representing the amplitude variation of the unattenuated speech signals. In the illustrated embodiment, this circuit is a read-only-memory which preferably is a programmable read-only-memory (PROM) 100. The PROM 100 is programmed as a code converter to produce the proper binary signals to the variable attenuator 80 for each syllable of the speech word. The memory 100 is programmed such that high values of the 16 bit signal on the lines 30 cause high attenuation in the attenuator 80 and vice versa. Also, because the transfer function of the digital attenuator 80 is not linear, the memory 100 is programmed to account for this non-linearity when it generates the digital signals on the lines 82 from the 16 bit signals on the line 30. Because the signals produced on the line 30 by the circuitry 22 represent only the envelope variations, and not the instaneous level of sinusoidal components of the speech signal, the above described constant amplitude compressor output denotes constant peak amplitude on a syllabic basis.

The PROM 100 is conventional and may be considered as a code converter or a hook-up table. The PROM 100 is programmed to produce given output words for particular input words. According to a feature of the invention, the PROM 100 is responsive to input signals of only 8 bits. These 8 bits are derived from the 12 bit signals generated by the analog to digital converter 68 and is accomplished by "shifting" certain bits output by the converter 68.

That is, although 12 bit resolution is required to represent signal variations when the signal level is close to minimum, that amount of resolution is unnecessary and uneconomical in terms of PROM usage as the signal level approaches maximum. For example, a variation of 0.01 volt at a signal level of 1 volt is a 1% variation, while at a signal level of 5 volts it is only a 0.2% variation. Accordingly, the 12 bit values are converted to 8 bit values according to a weighted scale. At the lowest signal levels, the conversion is essentially on a 1 for 1 basis while at the higher bit values many of the 12 bit values are skipped until between the bits 255 and 256 of the 8 bit signal there are approximately 64 12-bit values. Thus the PROM 100 input words range from binary 0 to binary 255, but represent their values of binary 0 to binary 4095 in a weighted curve. The actual variation in level, measured in db, between each of the 256 levels is relatively constant at about 0.2 db.

As another feature, because the digital attenuator 80 does not have a linear transfer characteristic, the PROM 100 is programmed to take the non-linearity into account.

Figure 4:
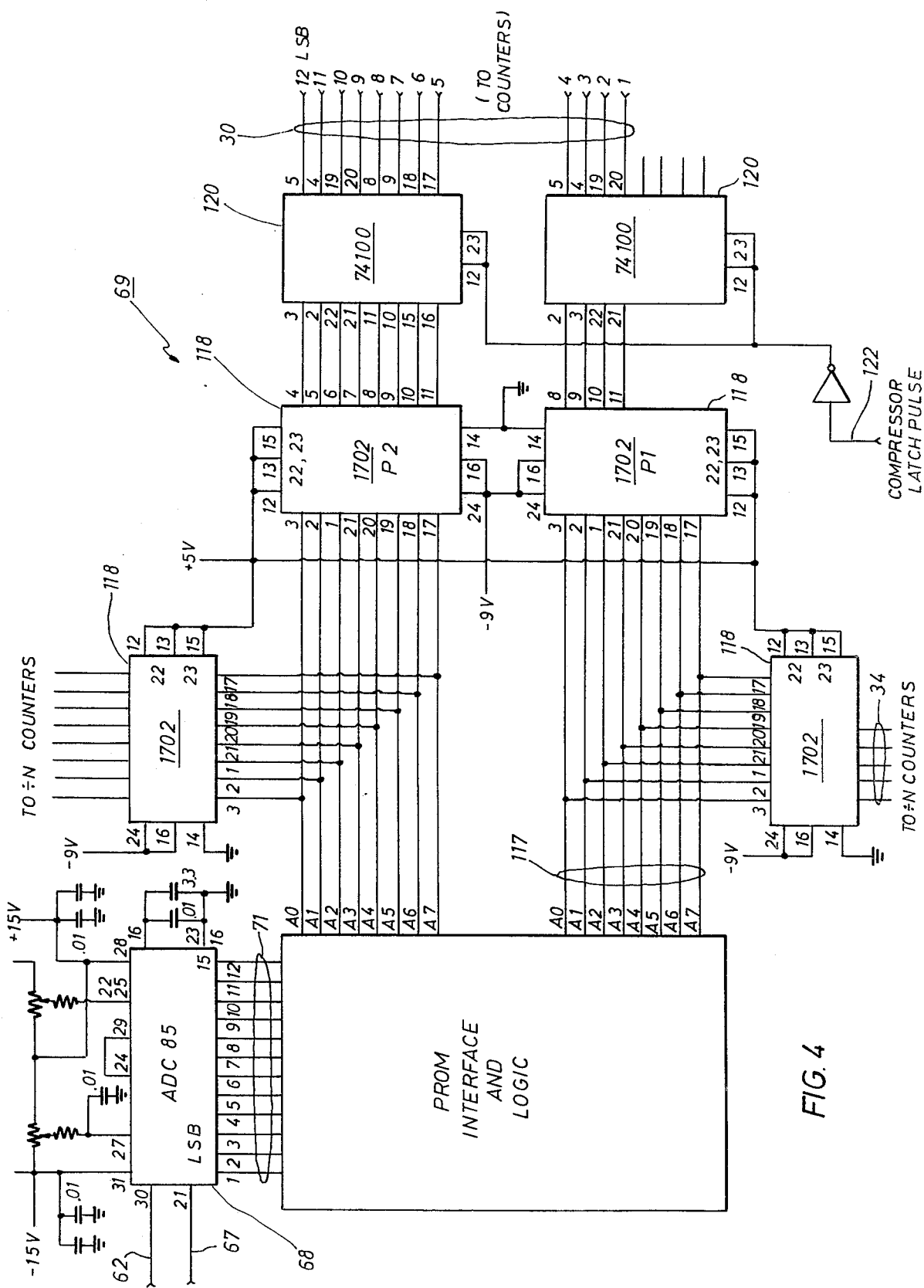
FIGS. 4 and 5 depict circuits for generating a control tone signal utilized in the system of FIGS. 1a and 1b.
Figure 5:
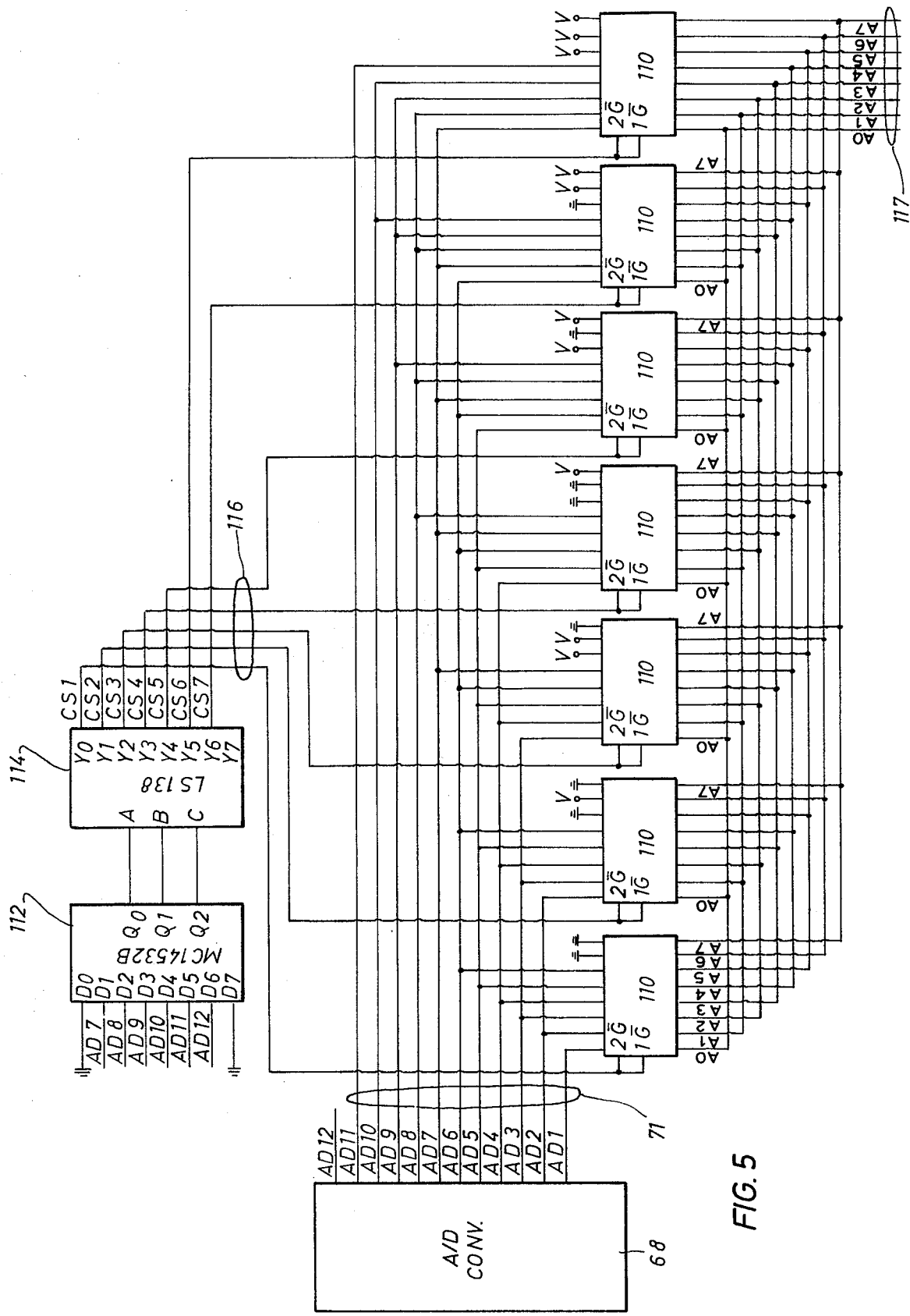

Referring now to FIGS. 4 and 5, the control circuitry 69 is shown in more detail. The output lines 71 from the converter 68 provide inputs to 7 sets of 3-state octal buffers 110. Recalling that the output signals from the converter 68 are in a 12 bit format, bits 7-12 are routed through an 8-bit priority encoder 112 which is in turn coupled to a 3-line to 8-line decoder 114. The output signals from the decoder 114 are conveyed via a set of lines 116 as control inputs to the buffers 110 for selecting which of the buffers are enabled for processing the selected bits of the 12 bit output from the converter 68.

The output from the buffers 110 are coupled to sets of encoders 118 for conveyance to the PROM 100 via a pair of latches 120. The latches 120 are updated by a 54 KHz compressor latch pulses on a line 122 generated by the control tone generator 26.

In operation, as the speech signal amplitude rises from zero, the first of the buffers 110 is selected, since the first of the buffers 110 is connected to the lowest order output lines from the analog to digital converter 68. The first buffer set follows the first 63 bits from the converter 68 on a 1 to 1 basis. As the envelope amplitude continues to rise, the second of the buffers 110 is selected and causes the PROM control lines 30 to follow the output of the converter 68 on a 1-for-2 ratio for 31 bits. This process continues as each buffer set is enabled. Buffer set 3 of the buffers 110 produces a 1-for-4 ratio for the next 31 bits and so on until the last of the buffers 110 produces a 1-for-64 ratio for the last 31 bits. The least significant bit inputs of the buffers are hardwire connected to circuit ground, and to logic high to produce the proper least significant bit for the PROM control lines 30. Thus, the PROM 100 sees binary 0-binary 4095 in progressively longer steps.

Figure 6:
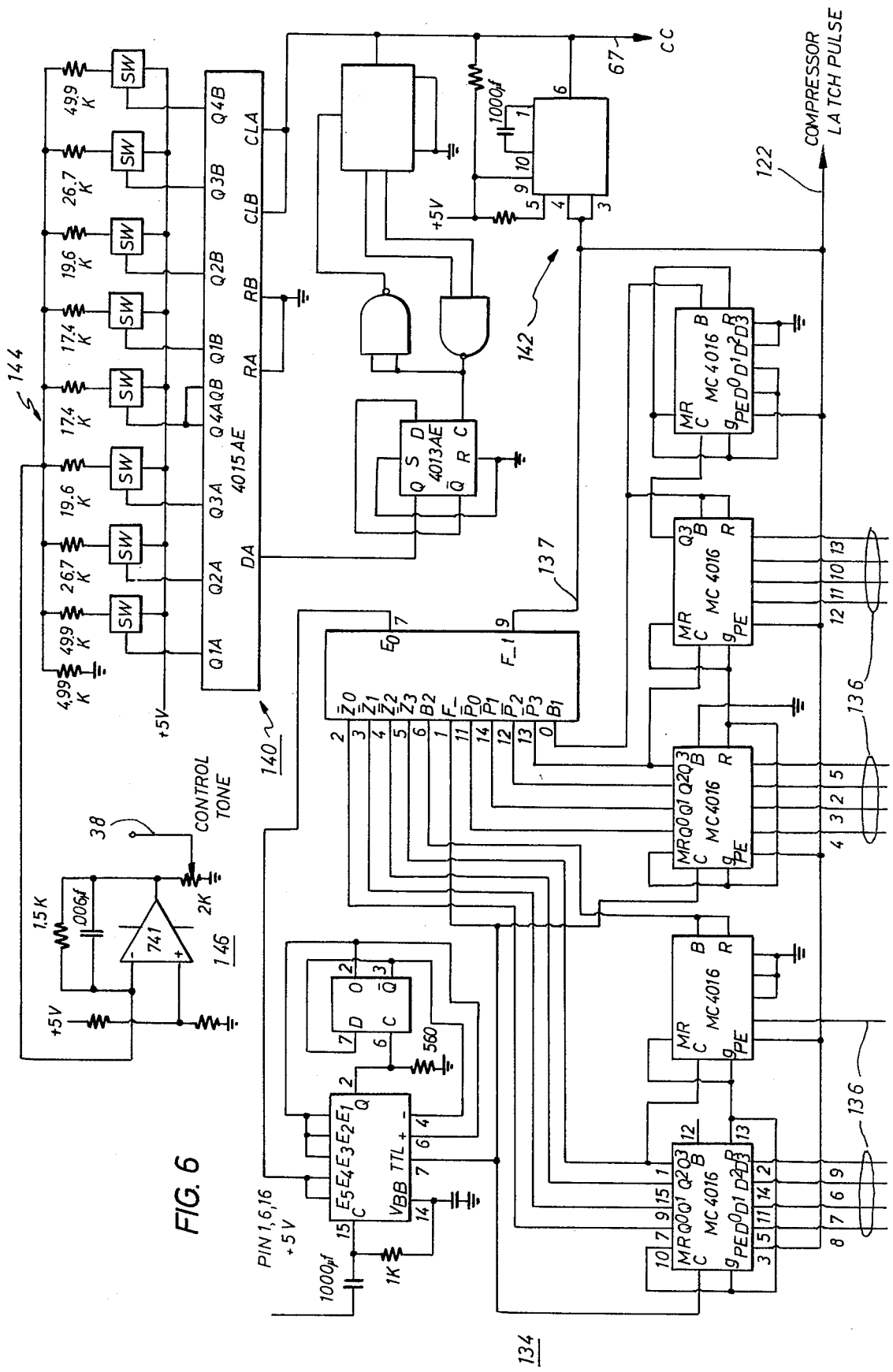
FIG. 6 depicts a variable divider circuit and a digital-to-analog converter circuit utilized in the system of FIGS. 1a and 1b.

Referring now to the control tone generator 26, as seen in FIGS. 1a and 6, the VCO 36 has its input signal generated by a programmable read only memory (PROM) 130. The oscillator 36 generates the control tone signal to have a constant amplitude with center frequency around 2.9 KHz. The frequency is varied in relation to the envelope variations of the speech signal.

The voltage control oscillator 36 includes a phase-lock-loop controlled oscillator 132 running at a frequency of 320 MHz.

The PROM 130 is conventional and is programmed as a code converter to produce particular whole-number divisors to the VCO 36. Logarithmic conversion and divisor roundoff are both accomplished in one step via the PROM 130.

The voltage control oscillator 36 also includes a programmable variable divider 134 which is coupled to the oscillator 132. The divider 134 reduces the 320 MHz frequency to a frequency which varies about a 54 KHz frequency, depending upon the state of the divider 134. This nominal 54 KHz signal is the CC cycle control signal applied to the converter 68 via the line 67. The CC control signal syncrinizes the circuitry 22 and the control tone generator 26 such that the instantaneous sample taken by the circuitry 22 is simultaneously producing its resultant control tone signal for the generator 26 and its resultant amplitude adjustment in the circuitry 24.

The value or divisors of the divider 134 are selected through the PROM 130 and are input via a set of lines 136. To reduce the number of high-frequency divider stages while retaining diviser/quotient resolution, the variable modulus prescaler technique is utilized in the divider 134. The values of the dividers are related to the envelope of the speech signal as it varies in amplitude. The variations in the divisor value on the lines 136 cause appropriate variations in the nominal 54 KHz variable divider output on a line 137.

The control tone generator 26 also includes a digital-to-analog converter 140. The digital to analog converter 140 produces a step approximation of sign wave, each complete cycle consisting of 18 steps. Each step is triggered by one cycle of the 54 KHz input on the line 137. Thus the output is a 2.9 KHz signal at 54 KHz input. The output changes directly with input as the input is changed by the variable dividers 134. The nominal 2.9 KHz output of the digital to analog circuit 140 changes "phase" in steps of about 20. Obviously, smaller steps could be achieved if the 54 KHz frequency were increased.

The digital-to-analog converter 140 includes a one-shot multivibrator 142, a digitally variable voltage divider 144, and an output buffer amplifier 146. The multivibrator 142 provides the CC cycle control pulses for the analog-to-digital converter 68 as previously described.

The voltage divider 144 is also coupled to the output of the multivibrator 142 and provides a digital signal having amplitudes varying in a step-wise fashion. The output level of the divider 144 is changed slightly each time an input pulse occurs from the multivibrator 142. The direction and amount of change are internally controlled to produce a step approximation of a sign wave. The number of steps or input pulses to produce one cycle output in the preferred and illustrated embodiment is 18. Thus the nominal 54 KHz input produces 3 KHz output. Any variation in input frequency is accurately represented by the output of the digital-to-analog converter 140 and, due to the circuit properties, even an abrupt change in frequency produces no discontinuities in the output wave form.

The buffer amplifier 146 smooths the stepped variable output from the divider 144 and serves to isolate the divider 144 from external circuit loading conditions. The output of the buffer amplifier is the control tone signal generated on the line 38.

As earlier mentioned, the output frequency of the control tone signal changes phase in steps of approximately 20 [in the preferred and illustrated design]. These steps can be made smaller if the 54 KHz frequency were increased and the number of increments in the divider 144 were increased from 18. An increase in the number of steps decreases the additional band width spectrum required of the control tone signal. A filter on the VCO output accomplishes approximately the same function, but introduces additional time delays.

Although not mentioned it is understood that time delays are incorporated into the circuitry herein above described in a conventional manner. Such time delays are utilized in lincompex systems when necessary for signalling pulses or privacy equipment. Such delays are also to be utilized when necessary in the demodulator 14.

Referring again to FIG. 1a, the output circuitry 28 is responsive to the control tone signal on the line 38 and to the compressed speech signal on the line 32 for combining them and transmitting them onto the transmission of medium 16. The output circuitry 28 includes an attenuator 150 and a summing circuit 152. The attenuator 150 selectively attenuates the control tone signal 6 db, and the summing circuit 152 linearly adds the constant amplitude compressed speech signal with the control tone signal. The resulting composite signal is passed through a filter 154 for modulating a transmitter (not shown) accompanying the transmission medium 16. The filter 154 is a bandpass filter similar to the filter 60, having a pass band of 200-3100 Hz.

It is understood, of course, that the composite signal provided to the transmission medium 16 could be sent at other than −6 db levels.

The output circuitry 28 also includes a pair of switches 160, 162. The switch 160 selectively couples the compressed speech signal from the digital attenuator 80 to the summing circuit 152. The switch 162 selectively couples the composite signal from the summing circuit 152 to the filter 154.

The switches 160, 162 are utilized in conjunction with a transmit key detect circuit 164 for calibration purposes. Upon transmitter key-down, the output of the modulator 12 is enabled, the audio channel (i.e. the compressed speech signal on the line 32) is disabled via the switch 160, and attenuation of the control tone signal on the line 38 is removed via disablement of the attenuator circuit 150. This sequence is confined to a period of approximately 100-200 milliseconds following each transmitter key-down. During this time, the control tone signal is transmitted at full power. Thereafter, the switch 162 is operated to switch-off all transmission for a short interval after which normal transmission of the compressed speech signal and a control tone signal is resumed. A one-shot multivibrator may be used for providing the calibration period.

Figure 7:
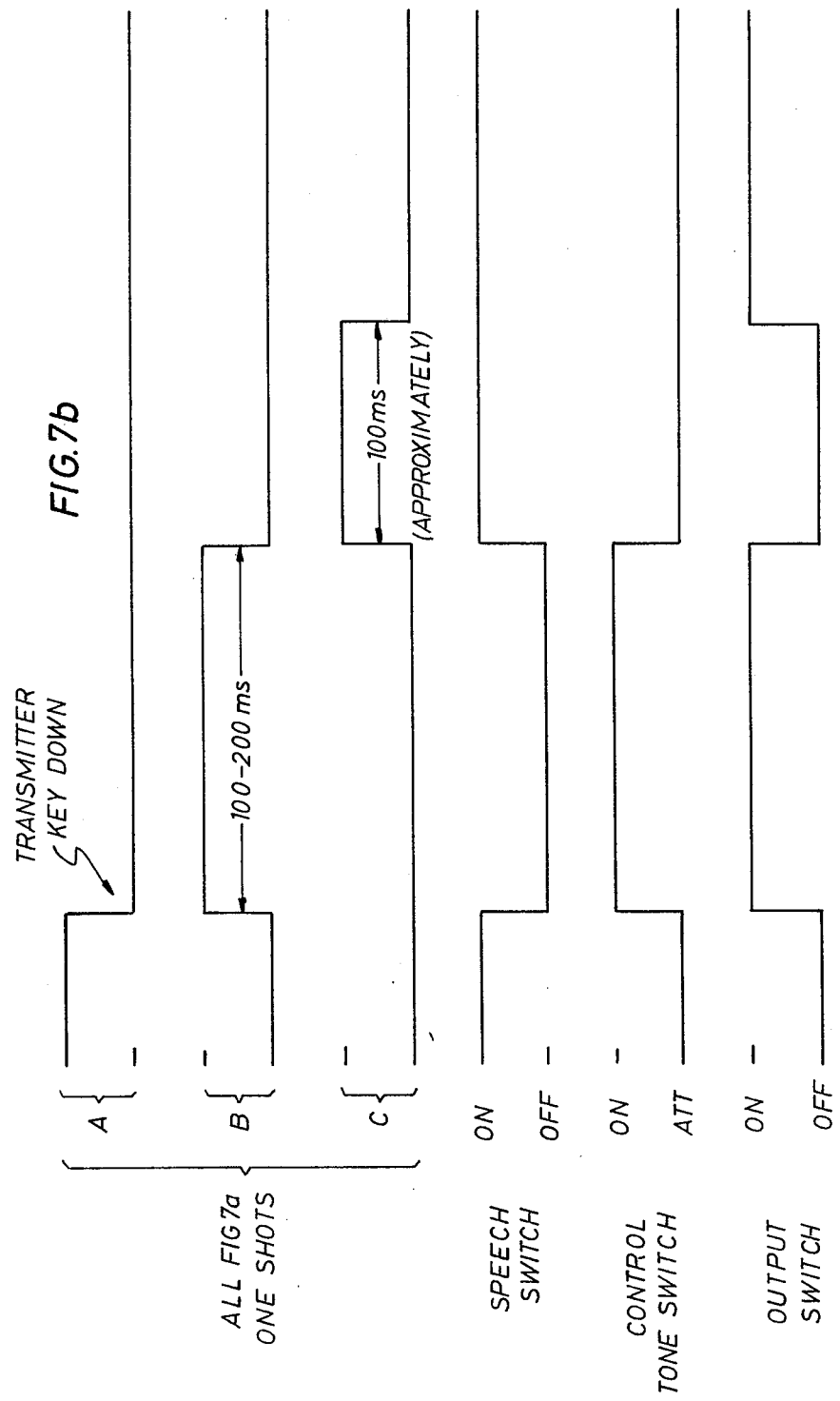
FIGS. 7a and 7b depict a transmit key detector circuit and a timing diagram therefore utilized in the system of FIGS. 1a and 1b.

The transmit key detect circuit 164 is shown in detail in FIG. 7a, and its operation is disclosed in FIG. 7b. The switches 160, 162, the attenuator 150, and the speech and control tone inputs 32, 38 respectively are schematically redrawn and it is believed that further description is unnecessary.

As will be explained subsequently with respect to the demodulator 14, during the calibrate period the unattenuated control tone signal is utilized for calibrating the receiver circuitry in the demodulator 14.

As an outstanding feature of the invention, a data multiplexer is provided for maximizing efficiency of the transmitter. Transmission of normal voice transmission is estimated to be approximately 50% quiet; that is, for normal speech transmission there is significant energy for only 50% of the time. During the quiet times, the invention transmits, or attempts to transmit, packets of data across the transmission medium 16. The demodulator detects these quiet times using control tone information, and strips out the data from the speech and thereby prevents it from reaching a listener to the speech signal.

The modulator attempts to insert a data packet each quiet period. If the quiet period does not exist for a minimum time, the modulator attempts to retransmit the same data during the next quiet period and so forth. Conversely, the demodulator must receive the data for a minimum time in order to accept the full data packet. Each data packet has a synchronization heading followed by pre-timed data increments. Since the instant at which speech power reappears is known to both the modulator 12 and demodulator 14, the negation of data by returning speech is recognized by both. In the interrupted data situation, the data packet is retransmitted upon the occurrence of the next quiet period.

Since approximately 2400 Hz band width is available for a data transmission during quiet periods, both single and multitone data may be transmitted. Speed of data transmission is determined by the available bandwidth, exciter and receiver filter characteristics, etc.

The data multiplexor 170 includes a space detector 172 and a buffer store circuit 174. Data is input to the buffer store circuit 174 via a line 176 where it is stored until it is commanded by the space detector 172 to be stepped out onto a line 178 for input onto the transmission medium 16 via the switch 162. The space detect circuit 172 detects termination of the control tone signal (and thus no transmitted compressed speech signal) to condition the switch 162 to receive the data onto line 178.

If the space detect circuit 172 detects that the time interval between transmitted speech syllables is less than a time necessary to complete a full packet of data, it generates a RESTORE SIGNAL on a line 180 to the buffer store circuit 174 causing the data on the line 178 to be restored into the circuit 174 for a subsequent attempt at transmission.

The Demodulator 14

The composite speech signal which is received at the extreme end of the transmission medium 16 is usually varying in amplitude because of fading and/or may be noisy because of electromagnetic interference, etc. However there is information in the signal in the form of the proportionally varying frequency of the control tone signal representing the amplitude of the envelope variations of the compressed speech signal. The envelope variations in the demodulator 14 are restored in essentially the same manner as they were removed, by a digital attenuator circuitry comprising the expander circuitry circuitry 42.

The input circuitry 40 includes a fading regulator 90 and a pair of filters 92, 94. The fading regulator 90 removes any audio level variations not removed by the automatic gain control circuitry in the receiver. The fading regulator design is conventional.

The filter 94 is a bandpass filter which separates the control tone signal from the composite speech signal. The filter 94 is an 8-pole Bessel type filter designed to have a constant time delay versus frequency characteristic and sharp cut-off characteristics. The control tone signal is thereupon imposed onto the line 48 for processing by the calibrate and control tone discriminator circuitry 44 for operating the expander circuitry 42.

The filter 92 is a conventional bandpass filter having a pass band of 200–2700 Hz. The output from the filter 92 is the compressed speech signal on the line 46 and is input to the expander circuitry 42.

The expander circuitry 42 includes a digital attenuator 200, a programmable read only memory (PROM) 202 and a filter 204. In the preferred embodiment the digital attenuator 200 is identical to the digital attenuator 80 utilized in the compressor circuitry 24 and will not be further discussed.

The PROM 202 is conventional and, in a fashion similar to that for the PROM 100, is for operating the 12 bit digital attenuator. Because the digital attenuator 200 has a non-linear transfer function, the PROM 202 takes this non-linearity into consideration when the PROM 202 is programmed. The PROM 202 is driven from the 8 least significant bits of a 13 bit output word generated by the calibrate and control tone discriminator circuitry 44.

The calibrate and control tone discriminator circuitry 44 includes a threshold detector 210. The threshold detector 210 converts the control tone signal into a nominal square wave. The threshold detector 210 is conventional and is implemented using biased rectifier/limiter techniques.

The square wave control tone signal from the threshold detector 210 is thereupon input to a digital divider 212 and to a control logic circuit 214. The digital divider in the preferred and illustrated embodiment divides by 16 for reducing the percentage of edge-jitter by a factor of 16. The signal is divided solely to minimize the effects of noise. Of course, the amount of division is flexible and depends upon system applications. A lower number of divisions produces more updates of information per unit time, but also allows more noise effects to be passed. Dividing by a higher number reduces the effect of noise, but also reduces the information updates or sample rate.

Figure 8:
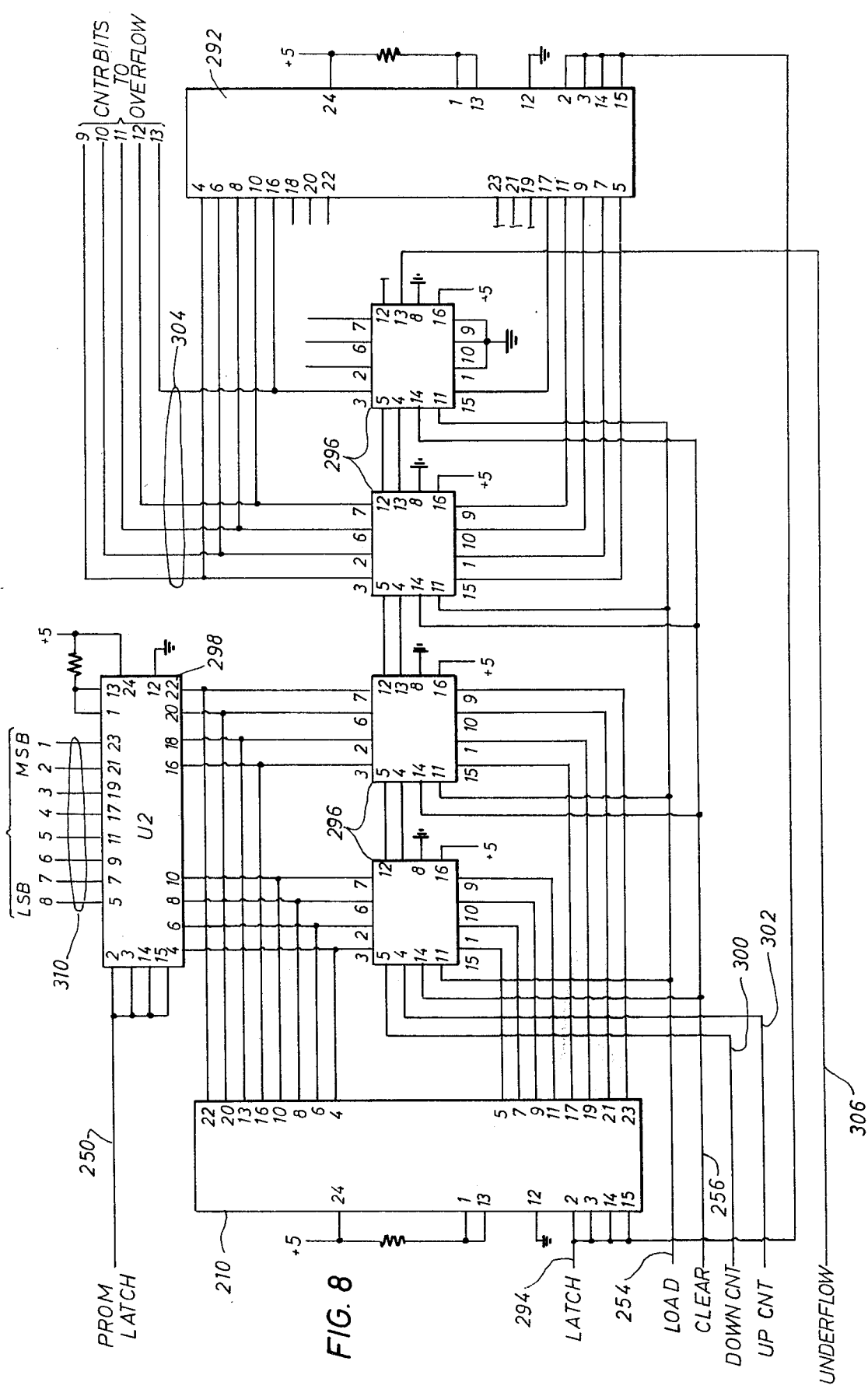
FIG. 8 depicts circuitry utilized in the demodulator of the system of FIGS. 1a and 1b.
Figure 9:
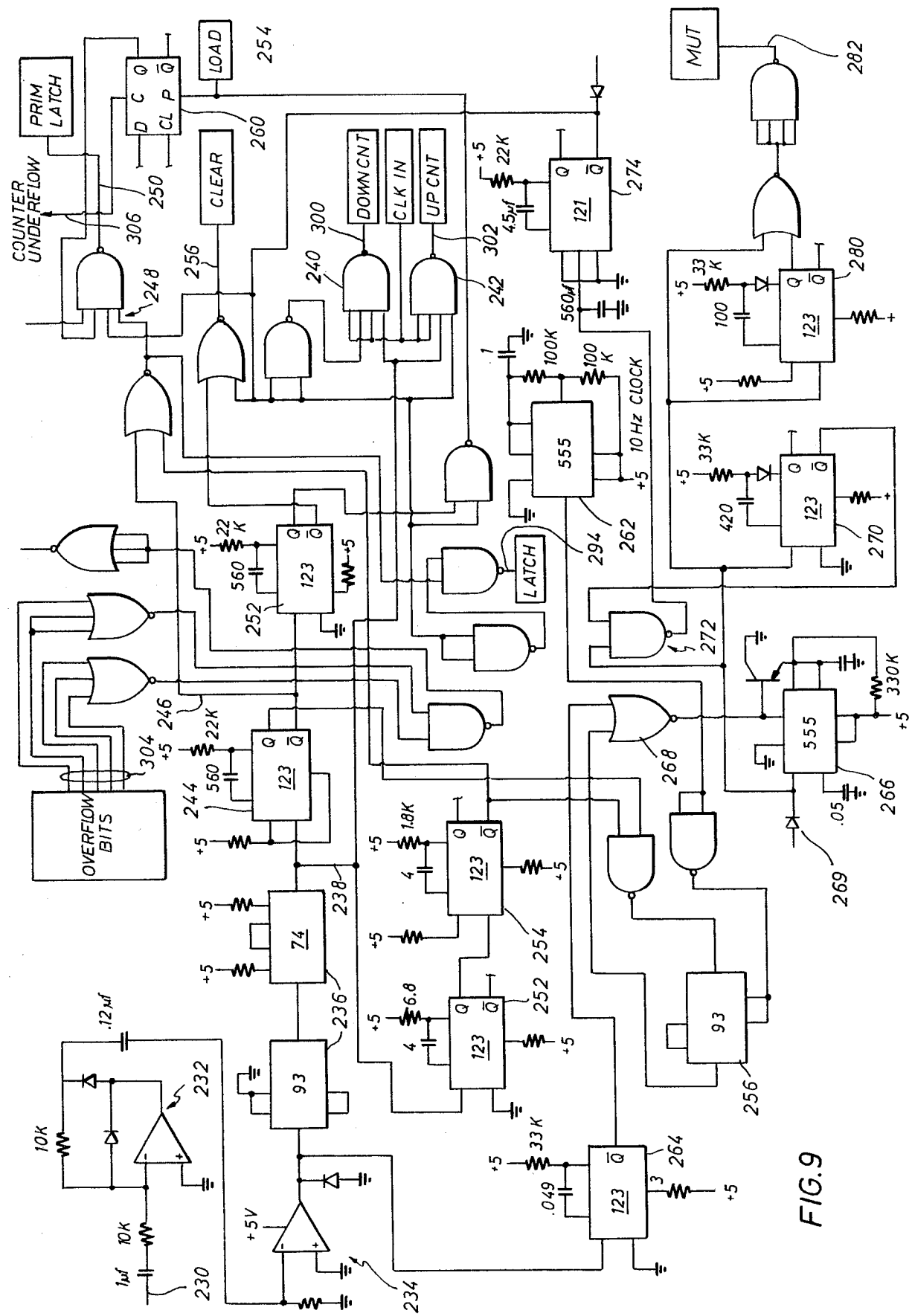
FIG. 9 depicts logic circuitry utilized in the system of FIGS. 1a and 1b.

The control logic 214 operates in conjunction with a counter 216 and a latch 218 for providing the binary input signals to the PROM 202 necessary for determining the amount of attenuation which the compressed speech signal will undergo in the expander circuitry 42. Referring now to FIGS. 8 and 9 the logic circuit 214 receives the square wave control tone signal on a line 230 where the signal is AC coupled through a rectifier circuit 232. The rectifier circuit 232 biases the square wave control tone signal and noise therein contained such that a limiter 234 connected to the output of the rectifier circuit 232 does not trigger from zero-centered noise when the control tone signal is minimal. This is a feature which allows the detection of a weak signal in noise since flat noise at the input of the demodulator 14 appears at the output of the filter 94 and therefore would tend to indicate center frequency on an average basis.

The output of the limiter 234 is input into a divide-by-16 counter 236. The output of the counter 236 is a square wave which is input to a line 238 to a pair of gates 240, 242 for producing DOWN CNT and UP CNT SIGNALS respectively for use by the counter 216.

The square wave from the counter 236 also goes to a retriggerable one-shot circuit 244. The retriggerable one-shot 244 provides an output on a line 246 to a pair of gates 248 which produce a PROM LATCH signal on a line 250. The output of the counter 236 also goes to a pair of one-shots 252, 254 which provides a time window. If the falling edge of the one-shot 244 is within the window generated by the one-shots 252, 254, and absent overflow or underflow conditions of the counter 216, the PROM LATCH signal is generated on the line 250.

The output of the one-shot 244 also is coupled to a retriggerable one-shot 252. The output from the one-shot 252 is used for generating a LOAD or CLEAR PULSES on a pair of lines 254, 256 respectively. If the demodulator 14 is looking for a calibrate signal, the CLEAR PULSE is generated and conversely.

The output signal from the one shot 244 is also coupled to a counter 256. If the edge of the signal from the one-shot 244 falls outside the window determined by the one-shots 252, 254, the counter 256 is triggered.

The window generated by the one-shots 252, 254 provides a pulse within which the edge of a valid control tone frequency signal, as indicated by the output from the one-shot 244, should fall. When a valid load pulse does occur, a flip flop 260 is reset.

The counter 256 is employed to count the number of latch pulses which fall outside the acceptable window generated by the one-shots 252, 254. The counter 256 is reset by a free running counter 262. A one-shot 264 is coupled to the limiter 234 for generating pulses to a timer 266. The timer 266 generates RESET pulses. If more than a selectable number of bad latch pulses occur between the RESET PULSES, the pulses generated by the one-shot 264 are passed by a logic circuitry 268 for firing the timer 266. The timer 266 drives an indicator 269 for indicating poor signal-to-noise ratio.

If the output of the timer 266 shows the absence of control tone signal or indicates the passage of an amount of time prescribed by a one-shot 270, the output from the one-shot 270 and the output from the timer 266 are gated to-gether by a gate 272. The gate 272 is coupled to a one-shot 274 which controls the DOWN CNT and UP CNT signals as well as the LATCH SIGNAL.

As a feature of the invention, a one shot 280 is coupled to the output of the timer 266 to mute the speech signal by generating an MUTE signal on a line 282.

Referring now to FIG. 8 and to the counter 216 and the latch 218 in more detail, a pair of 8 bit latches 290, 292 are responsive to the LATCH SIGNAL on a line 294. The LATCH SIGNAL is used to store a calibration count in the latches 290, 292.

A set of up-down counters 296 are provided, along with an 8 bit latch 298. The counters 296 have their control terminals connected to the lines 254, 256 for receiving the LOAD and CLEAR signals respectively. The control terminals are also coupled to a set of lines 300, 302 for receiving the DOWN CNT and the UP CNT signals on a pair of lines 300, 302 respectively from the logic circuitry 241. The 8 least-significant-bits from the counters 296 are input to the latch 298 and to the input side of the latch 290. The five most-significant-bits from the counters 296 are output on a set of lines 304 to the control logic 214 for use in generating the PROM LATCH signal on the line 250. The five-most-significant-bits on the lines 304 are also coupled to the input terminals of the latch 292. The five-most-significant-bits on the lines 304 are used to detect a data frequency which is apparently too high in frequency and thus should be ignored.

The highest order bits from the counters 296 generate an UNDER FLOW signal on a line 306 to the logic circuitry 214 for indicating data frequencies which are apparently too low in frequency. The UNDER FLOW signal is provided to the flip flop 260 for consideration when generating the PROM LATCH signal on the line 250.

In operation, the counters 296 are initiated during calibration by the beginning of a cycle of the control tone signal as indicated by the appearance of a CLEAR signal on the line 256. The counters count up as determined by the UP CNT signal on the line 302 until the count is terminated by the end of ½ a cycle of the control tone signal. At the end of the half cycle of the control tone signal, the UP CNT pulses stop, and a value resides in the counters 296. This value is thereupon latched into the latches 290, 292 upon generation of the LATCH signal on the line 294. Upon generation of the LOAD signal on the line 254, the values latched in the latches 290, 294 are input to the counters 296 for presetting them to the value of the calibration count.

After completion of the calibration step, data is received from the control tone generator. The counters 296 are counted down via DOWN CNT pulses on the line 300 for ½ the period of the control tone signal. The down counting of the counters 296 is stopped at the end of the half period, and the number remaining in the counters 296 is representative of the frequency of the received control tone signal. This final count is thereupon introduced into the latch 298 upon generation of the PROM LATCH signal on the line 250. From the latch 298, the number is output onto a set of lines 310 to the PROM 202 for controlling the amount of attenuation imposed upon the compressed speech signal by the digital attenuator 200. Immediately after the latching of the number into the latch 298, the counters 296 are present to the calibration count and a new down count cycle is triggered by incoming data.

It is to be understood that the calibration feature above described is not necessary in the digital lincompex unit. The circuitry could be programmed all the time with an equivalent signal signifying a transmission medium 16 without drift.

Operation of the calibration scheme is analyzed briefly as follows: A control tone of frequency fc is received. It is divided by N to produce a half-period gate calibration time of $$TGC = (N/2fc) \text{ seconds}$$

A standard oscillator of frequency fo is counted for TGC seconds, producing NGC pulses:

$$NGC = N/2fc \; fo$$

Let a control tone of frequency fs represent information; it is also divided down and represents $$TGS = N/2fs \text{ seconds}$$

of gating time. When the $fs/N$ cycle starts, a counter is preset to NGC and counts down for TGS seconds at the rate of fo hz.

Therefore $$NGS = (N/2fs) \; fo$$

and the count remaining is $$N = NGC - NGS = Nfo/2(fs-fc/fs\;fc)$$

Note that fs−fc represents the tune deviation $\Delta$ f of fs with respect to fc if fc=2840 Hz (assuming specifications similar to CCIR Rec. 455-1). If the received signal has drift ±E, then $$N = Nfo/2(\Delta f/(fs \pm E) \; (fc \pm E)$$

Since the total range of the control tone is only 120 Hz at 2900 Hz, the expression in the denominator is fairly constant. For E= +30 Hz, for example, a system without calibration will be in error 15 db whereas the system with the above calibration will be in error by only 1.2 db. This is significant; one is very audible, the other marginally audible.

Since the demodulator will calibrate itself based upon calibration data sent from the transmitting end, this feature allows net operations involving numbers of stations, where the frequency accuracy requirements of the participating exciters and receivers is greatly reduced. This is not true of conventional schemes.

Referring again to FIG. 1b, another feature of the demodulator 14 is the provision of a data demultiplexor 320 for use in conjunction with the data multiplexor 170. When data packets are being inserted in the modulator 12, a switch 322 in the input circuitry 400 routes the data to a buffer/store circuit 324 in the data demultiplexor 320. If the time period between transmitted speech syllables during which the data is transmitted is insufficient to complete transmission of the whole packet of data, the logic circuitry 214 generates an ABORT signal to the buffer/store 24 which erases the incomplete set of data therein stored. In the absence of an ABORT signal, the buffer/store circuit 324 transmits the data onto an output line 326.

As above described, the signal to noise ratio of the received control tone signal is derived. When the signal to noise ratio degrades below a predetermined threshold, the logic 214 generates the MUTE signal on the line 282 to a switch 330. Although not shown, it is apparent that other equipment could be employed for reacting to poor signal-to-noise ratio conditions. For example the LINCOMPEX function could be switched out in which case the incoming speech signal would be processed as though LINCOMPEX were not involved. Or, an indicator could be actuated to signal radio station personnel that the channel in use is noisy.

It will thus be appreciated that a new and improved digital lincompex unit has been described. Various features have been included, such as automatic calibration, a data multiplexing system, the provision of accommodating multitone data, and the generation of a signal-to-noise ratio signal for detecting whether the speech transmission is using LINCOMPEX, or whether the transmission medium 16 has become noisy.

Although a rather detailed description of a single preferred embodiment has been disclosed, it is understood that such detail has been for purposes of description only. Numerous changes and modifications will be obvious to those of ordinary skill in the art without departing from the spirit and the scope of the invention as hereinafter claimed.

What is claimed is:

1. A digital speech modulator for modulating syllables of a speech signal onto a transmission medium, the modulator including a digital compressor circuit comprising:
   (a) voltage attenuator circuit means for controllably attenuating a given syllable of the speech signal by a value determined in response to a first plurality of binary input signals;
   (b) means for generating said first plurality of binary input signals collectively to be representative of the amplitude variance of said syllable,
   (c) control tone generator circuit means for producing a control tone signal where frequency is representative of the amplitude variance of said syllable; and
   (d) output circuit means for combining the compressed speech signal and the control tone signal for transmission onto said transmission medium.

2. The modulator according to claim 1 wherein said voltage attenuator circuit means comprises:
   (a) a plurality of resistors coupled to receive the speech signal; and
   (b) a plurality of switches responsive to said first plurality of binary input signals for allowing conduction of said speech signal through selective ones of said resistors.

3. The modulator according to claim 2 wherein said switches are field-effect transistors.

4. The modulator according to claim 1 and further including a demodulator for receiving a compressed, frequency modulated speech signal having a substantially constant amplitude, said demodulator including digital expander circuit means having a voltage attenuator circuit for controllably attenuating a given syllable of said compressed speech signal by a value determined in response to a second plurality of binary input signals collectively representative of the amplitude variance of said syllable before it was compressed to have said substantially constant amplitude.

5. The modulator according to claim 4 wherein the voltage attenuator circuit of said digital expander circuit comprises:
   (a) a plurality of resistors coupled to receive the compressed speech signal, and
   (b) a plurality of switches responsive to said second plurality of binary input signals for allowing conduction of said compressed speech signals through selected ones of said resistors.

6. The modulator according to claim 1 wherein said means for generating includes a read-only-memory coupled to said digital compressor circuit for generating said first plurality of binary input signals.

7. The modulator according to claim 6 wherein said read-only-memory is programmable.

8. The modulator according to claim 6 and further including an encoder responsive to a plurality of N-bit binary signals representative of the amplitude variance of a given syllable of said compressed speech signal for generating a set of less-than-N binary signals to said read-only-memory, whereby the range of values represented by said N-bit signals is spanned by the values of said less-than-N bit signals according to a weighted curve such that low values of the N-bit signals are more nearly equal to the corresponding produced value of the less-than-N bit signals than for comparatively higher values.

9. The modulator according to claim 1 wherein the output circuit means includes:
 (a) a switch coupled for interrupting the compressed speech signal; and
 (b) means for momentarily operating the switch to thereby allow a calibration period during which the compressed speech signal is not transmitted onto said transmission medium.

10. The modulator according to claim 1 wherein said control tone generator circuit means includes:
 (a) a phase-locked-loop voltage controlled oscillator for generating an oscillator signal; and
 (b) a variable frequency divider circuit responsive to a third plurality of binary signals representative of the amplitude variance of a given syllable of said speech signal, for changing the frequency of said oscillator signal corresponding to said amplitude variance.

11. The modulator according to claim 10 wherein said variable divider circuit is a variable modulus divider wherein the value of the modulus is determined in relation to the amplitude of the syllable.

12. The modulator according to claim 11 and further including a second read-only-memory for producing said third plurality of binary signals to said variable voltge divider.

13. The modulator according to claim 10 and further including:
 (a) an attenuator coupled to the output of said variable voltage divider for selectively attenuating said control tone signal;
 (b) a switch coupled to the output of said digital compressor circuit; and
 (c) means for operating the switch and the attenuator to momentarily allow an unattenuated control tone signal onto said transmission medium in the absence of the compressed speech signal.

14. The modulator according to claim 1 and further including data multiplexer means for detecting quiet periods between the transmission of the compressed speech syllables on said transmission medium and for selectively inserting packets of data onto said transmission medium during said quiet periods.

15. The modulator according to claim 14 wherein said data multiplexer means includes:
 (a) a buffer/store circuit for selectively providing said packet of data to the transmission medium; and
 (b) means for restoring a given packet of data to said buffer/store circuit if the quiet period is insufficient to completely transmit said packet.

16. A digital speech demodulator for demodulating syllables of a compressed speech signal received from a transmission medium by using a modulated control signal which is transmitted on the medium in conjunction with the compressed speech signal, the syllables of the received compressed speech signal having a substantially constant amplitude and the value of the control signal being representative of the amplitude variation of the original speech signal prior to its being compressed onto said medium as said compressed speech signal, the demodulator including a digital expander circuit comprising:
 (a) voltage attenuator circuit means, including a plurality of transistorized switch attenuators, for controllably attenuating a given syllable of the compressed speech signal by a value determined in response to a first plurality of binary input signals, thereby to recreate the original speech signal; and
 (b) means responsive to said modulated control signal, and including a digital counter, for generating said first plurality of binary input signals to be collectively representative of said amplitude variance of the given corresponding syllable of said original speech signal.

17. The demodulator according to claim 16 wherein said means for generating includes a read-only-memory for generating said first plurality of binary input signals.

18. The demodulator according to claim 17 wherein said read-only-memory is programmable.

19. The demodulator according to claim 18 and further including a control tone discriminating circuit for generating to said programmable read-only-memory a set of digital signals indicative of the amplitude variance of a syllable of said unattenuated signal.

20. The demodulator according to claim 16 and further including calibrate circuit means responsive to the modulated control signal transmitted on the transmission medium during a predetermined time period prior to the transmission of the compressed speech signal, for storing the value of the center frequency of the modulated control signal.

21. The demodulator according to claim 20 wherein said calibrate circuit means includes at least one counter which is set to said center frequency value as determined during said predetermined time period.

22. The demodulator according to claim 21 wherein said at least one counter includes:
 (a) at least one latch circuit for storing the value of said at least one counter at the end of said predetermined time period, and
 (b) means for presetting the at least one counter to the value stored in said latch prior to the receipt of said compressed speech signal.

23. The demodulator according to claim 16 wherein said means for generating said first plurality of binary input signals includes:
 (a) a counter;
 (b) means for presetting the counter to a value prior to receipt by the demodulator of said compressed speech signal; and
 (c) means for causing the counter to count for a period determined by the amplitude variance of the syllable of the received compressed speech signal.

24. The demodulator according to claim 23 and further including calibrate circuit means, responsive to the modulated control signal transmitted on the transmission medium during a predetermined time period prior to the transmission of the compressed speech signal, for determining said counter value.

25. The demodulator according to claim 24 wherein said calibrate circuit means includes at least one latch circuit for selectively storing said counter value while said at least one counter is counting.

26. The demodulator according to claim 16 and further including means for indicating a poor received-speech-signal to noise ratio, said means for indicating being responsive to the modulated control signal, said indicating means detecting the relative absence of control tone signals during given periods for generating a signal-to-noise ratio signal.

27. The demodulator according to claim 26 and including a switch responsive to said signal-to-noise-ratio signal for selectively deactivating said digital expander circuit.

28. The demodulator according to claim 26 wherein said demodulator generates an expanded speech signal during high signal-to-noise ratio conditions, and wherein said means for detecting is responsive to said signal-to-noise-ratio signal for muting said expanded signal when the signal-to-noise ratio falls below a predetermined value.

29. The demodulator according to claim 16 and further including data demultiplexing circuit means for receiving data transmitted from said transmission medium during time periods between the transmission of said compressed speech signal.

30. The demodulator according to claim 29 wherein said data demultiplexer circuit means includes:
  (a) a buffer/store circuit;
  (b) a switch coupling the transmission medium to said buffer/store circuit; and
  (c) means for operating the switch and the buffer/store circuit to selectively transmit data from the transmission medium into the buffer/store circuit.

31. The demodulator according to claim 30 wherein said data transmitted on the transmission medium is transmitted in certain time intervals, and wherein said means for operating effects erasure of the data stored in said buffer/store if the certain time interval required for complete transmission of the data is interrupted by the transmission of a compressed speech syllable.

32. The demodulator according to claim 29 wherein said data is multi-tone data.

33. In a linked compressor expander communications system having a speech signal over a transmission medium to a speech receiver, the speech signal being defined by a compressed speech signal and a control tone signal frequency division multiplexed over the medium, said control tone signal being frequency modulated to represent the amplitude variation of syllables of the compressed speech signal, the method of expanding the compressed speech signal at the receiver comprising the steps of:
  (a) transmitting cycles of said control tone signal at a nominal, unmodulated frequency for a first period of time;
  (b) detecting the value of a reference period for said control tone signal corresponding to said unmodulated frequency;
  (c) changing the value of said reference period according to the frequency modulated control tone signal, thereby to provide a resulting value which is indicative of said amplitude variation; and
  (d) attenuating said compressed speech signal by an amount determined by said changed value.

34. The method according to claim 33 wherein said step of transmitting occurs upon each transmitter key down and includes the steps of:
  (a) disabling the transmission of said speech signal for said first period of time and
  (b) removing any attenuation from said control tone signal for said first period of time.

35. The method according to claim 33 wherein said step of detecting includes detecting a reference period corresponding to less than one cycle of said control tone signal.

36. The method according to claim 35 wherein said reference period corresponds to one-half cycle of the control tone signal.

37. The method according to claim 33 wherein said step of changing includes the steps of:
  (a) presetting a counter to a counter value corresponding to said reference period value; and
  (b) changing said count in response to said frequency modulated control tone signal.

38. The method according to claim 37 wherein said steps of presetting and changing are sequentially accomplished during one cycle of said control tone cycle.

39. The method according to claim 37 wherein said step of presetting includes the step of zeroing the counter and incrementing the counter during one portion of one cycle or of one cycle after frequency division of said control tone signal, and said step of changing includes the step of decreasing the value of the counter during another portion of said one cycle.

40. The method according to claim 39 and further including the steps of:
  (a) generating a digital signal representative of said resulting value, said digital signal being representative of said amplitude variation; and
  (b) selectively attenuating said compressed speech signal in response to said digital signal.

41. The method according to claim 33 and further including the steps of:
  (a) generating a digital signal representative of said resulting value, said digital signal being representative of said amplitude variation; and
  (b) selectively attenuating said compressed speech signal in response to said digital signal.

42. In a linked compressor-expander communications system having a speech transmitter for sending over a transmission medium a syllable of compressed speech to a speech receiver for expansion, a method for increasing the efficiency of the system comprising the step of time-division-multiplexing packets of data onto said transmissions medium during time periods when syllables of speech are not being sent, wherein said step of time-division-multiplexing includes the steps of:
  (a) transmitting said packets of data until interrupted by the transmission of a speech syllable;
  (b) detecting whether a complete packet of data has been transmitted upon said interruption; and
  (c) retransmitting said transmitted packet of data if said step of detecting indicates that said step of transmitting failed to transmit a complete packet.

43. In a linked compressor-expander communications system having a speech transmitter for sending over a transmission mediums a syllable of compressed speech to a speech receiver for expansion, a method for increasing the efficiency of the system comprising the step of time-division-multiplexing packets of data onto said transmissions medium during time periods when syllables of speech are not being sent, wherein said step of time-division-multiplexing includes the steps of:
  (a) receiving said packets of data until interrupted by the receipt of speech syllable;
  (b) detecting whether a complete packet of data has been received upon said interruption; and
  (c) aborting said received packet of data if said step of detecting indicates that said step of receiving failed to receive a complete packet.

44. The method according to claim 43 wherein said step of time-division-multiplexing includes the steps of:
 (a) receiving said packets of data until interrupted by the receipt of speech syllable;
 (b) detecting whether a complete packet of data has been received upon said interruption; and
 (c) aborting said received packet of data if said step of detecting indicating that said step of receiving failed to receive a complete packet.

45. The method according to either claim 42 or 43 wherein said packets of data are multi-tone data.

46. The method according to either claim 42 or 43 and including the step of storing the transmitted data in case that a complete packet of data is not sent.

* * * * *